(12) United States Patent
Bramble

(10) Patent No.: US 7,663,265 B2
(45) Date of Patent: Feb. 16, 2010

(54) POWER SUPPLY ARRANGEMENTS

(75) Inventor: Matthew Forbes Bramble, London (GB)

(73) Assignee: Audio Partnership PLC, London (GB)

( * ) Notice: Subject to any disclaimer, the term of this patent is extended or adjusted under 35 U.S.C. 154(b) by 1972 days.

(21) Appl. No.: 10/346,650

(22) Filed: Jan. 16, 2003

(65) Prior Publication Data
US 2003/0160513 A1 Aug. 28, 2003

(30) Foreign Application Priority Data
Feb. 25, 2002 (GB) ................................. 0204318.0

(51) Int. Cl.
*H02J 4/00* (2006.01)
(52) U.S. Cl. ........................................................ 307/44
(58) Field of Classification Search ............. 307/43–46, 307/103; 455/3.06
See application file for complete search history.

(56) References Cited

U.S. PATENT DOCUMENTS

| | | | |
|---|---|---|---|
| 3,795,771 A * | 3/1974 | Gundersen et al. ........... | 370/242 |
| 4,428,078 A * | 1/1984 | Kuo ........................... | 455/3.06 |
| 5,131,048 A | 7/1992 | Farenelli et al. | |
| 5,255,322 A | 10/1993 | Farinelli et al. | |
| 5,745,159 A * | 4/1998 | Wax et al. ...................... | 725/76 |
| 5,942,811 A | 8/1999 | Stumfall et al. | |
| 6,011,322 A | 1/2000 | Stumfall et al. | |
| 6,515,851 B1 * | 2/2003 | Ootori et al. ........... | 361/679.08 |
| 6,549,754 B1 * | 4/2003 | Miller et al. ................ | 455/3.02 |

FOREIGN PATENT DOCUMENTS

| | | |
|---|---|---|
| JP | 2000184608 | 6/2000 |
| WO | WO 99/09787 A1 | 2/1999 |
| WO | WO 02/33953 A2 | 4/2002 |

OTHER PUBLICATIONS

UK Search Report dated Sep. 26, 2002.
European Search Report, dated Jun. 10, 2003.

* cited by examiner

*Primary Examiner*—Albert W Paladini
(74) *Attorney, Agent, or Firm*—TraskBritt

(57) ABSTRACT

A power supply arrangement for a distributed entertainment system. The power supply arrangement comprises: first and second power supplies, which are floating in relation to each other; a first electrical connector having a distributed impedance for connecting zone apparatus to the first power supply; and a signal processor which is operative to draw power from the second power supply and to transmit electrical signals to the zone apparatus and/or receive electrical signals from the zone apparatus, and in which the zone apparatus is operative to draw current from the first power supply, thereby causing a potential drop across the distributed impedance of the first electrical connector which in turn changes a voltage of a power supply rail at the zone apparatus, characterized by a second electrical connector for connecting the power supply rail of the zone apparatus to a power supply rail of the second power supply.

10 Claims, 3 Drawing Sheets

POWER SUPPLY ARRANGEMENTS

BACKGROUND OF THE INVENTION

1. Field of the Invention

The present invention relates to power supply arrangements for use in distributed entertainment systems.

A distributed entertainment system typically comprises audio/visual source equipment, such as a CD player, DVD, VCR, and the like, which is located in one room and linked to several zones, e.g., rooms, in the home. Such a system often includes a hub, which is situated near the audio/visual source equipment and which links the audio/visual source equipment to apparatus located in the various zones. The zone apparatus may, for example, include an amplifier and may also include means for control of certain characteristics of the output of a selected component of the audio/visual source equipment, e.g., volume or sound characteristics such as bass or treble, etc. The zone apparatus may also include means for exerting control over the source equipment itself, e.g., track skip, access of a certain preset/channel, etc.

2. State of the Art

In a distributed entertainment system, electrical power is usually conveyed from a main power supply in the hub by means of a respective pair of power supply conductors to each zone apparatus. Audio signals are transmitted from signal processing circuitry in the hub to each zone apparatus, for example, by means of the power supply conductors or by means of a separate pair of signal conductors. Control and data signals, which are often in a digital format, for example, signals for controlling the source equipment output characteristics, can also be transmitted to and from the signal processing circuitry to each zone apparatus by similar means.

Typically, the signal processing circuitry, the zone apparatus and the power supply each utilise power supply rails, from which power is drawn. Often, the power supply rails comprise multiple rails, of which one is a reference power supply rail.

During operation, the natural electrical impedance of the power supply conductors between the main power supply in the hub and the zone apparatus will cause the voltage at the power supply rails of the zone apparatus circuitry to be different than that at the hub. This is of particular concern in distributed entertainment systems where the cable runs can be substantially longer than in normal domestic entertainment systems.

The aforementioned problem can be exacerbated in distributed entertainment systems that include an amplifier module in the zone apparatus, which is powered from the hub via the power supply conductors. The electrical current requirements of zone amplifier apparatus can be substantial, thereby causing a large potential drop across a distributed impedance of the power supply conductors, which in turn changes a level of the power supply voltage that is delivered to the zone apparatus.

In addition, the electrical current requirements of a zone apparatus, which includes, for example, an audio amplifier, cannot only be significant but can also vary to a large extent. Thus, there can be a large variation in the level of the power supply voltage that is delivered to the zone apparatus. For instance, the current drawn by an amplifier usually varies considerably in sympathy with the variation in the amplitude of the output music signal over time.

The change in level of power supply voltage at the zone apparatus can cause corruption of the wanted audio, data and control signals that are transmitted to and from the zone apparatus.

For example, in the case of transmission of control and data signals from the hub signal processing circuitry to the zone apparatus, a voltage level mismatch can arise between the signal processing circuitry and the circuitry in the zone apparatus that receives the control and data signals. More specifically, a mismatch of the high and low logic levels of the digital circuitry in the signal processing circuitry and the zone apparatus can arise. The mismatch can cause a failure in recognition by the zone apparatus of control and data signals sent from the signal processing circuitry.

BRIEF SUMMARY OF THE INVENTION

The present applicant has realised the shortcomings of known power supply arrangements and has accordingly devised the present invention.

Therefore, according to a first aspect of the present invention, there is provided a power supply arrangement for a distributed entertainment system comprising: first and second power supplies, which are floating in relation to each other; and a first electrical connector having a distributed impedance for connecting zone apparatus to the first power supply, a signal processor which is operative to draw power from the second power supply and to transmit electrical signals to the zone apparatus and/or receive electrical signals from the zone apparatus, and in which the zone apparatus is operative to draw current from the first power supply, thereby causing a potential drop across the distributed impedance of the first electrical connector, which in turn changes a voltage of a power supply rail at the zone apparatus, characterised by a second electrical connector for connecting the power supply rail of the zone apparatus to a power supply rail of the second power supply.

In use, the second electrical connector can hold the power supply rail of the zone apparatus and the power supply rail of the second power supply at substantially the same voltage. Thus, corruption of the signals sent from the signal processor to the zone apparatus can be minimised.

The signal processor and zone apparatus may comprise digital circuitry and the electrical signals may comprise control and data signals of a digital format. According to such an embodiment, the presence of the second electrical connector can provide for proper matching of high and low logic levels of the digital circuitry in the signal processor and the zone apparatus. Thus, control and data signals that might be sent in a digital format from the signal processor are more likely to be recognised by the digital circuitry of the zone apparatus. Similarly, digital data and control signals that might be sent from the zone apparatus are more likely to be recognised by the digital circuitry of the signal processor.

More specifically, the second electrical connector may electrically connect a reference power supply rail of the zone apparatus to a reference power supply rail of the second power supply. Thus, the reference power supply rail of the zone apparatus can be held at substantially the same voltage as the reference power supply rail of the second power supply.

The zone apparatus may be a device which, in operation, draws a varying level of current from the first power supply. More specifically, the zone apparatus may include an amplifier. In use, the second electrical connector can maintain the power supply rail of the zone apparatus and the power supply rail of the second power supply at substantially the same voltage, thereby reducing the effects of a variation in the level of power supply voltage delivered to the zone apparatus.

The zone apparatus may comprise a regulator for regulating a voltage of a second power supply rail of the zone apparatus relative to a voltage of the power supply rail of the zone apparatus. The regulator might, for example, be a voltage regulator. More specifically, the power supply rail of the zone apparatus may be a reference power supply rail. Thus, in use, the regulator can hold the second power supply rail substantially at a predetermined voltage relative to the reference power supply rail, thereby reducing the effects of a reduction in voltage level at the second power supply rail.

The first and second power supplies may be provided by first and second secondary windings of a transformer, which are isolated from each other.

According to a second aspect of the present invention, there is provided a distributed entertainment system comprising a power supply arrangement according to the first aspect of the present invention.

According to a third aspect of the present invention, there is provided a method of arranging a power supply for a distributed entertainment system, comprising: providing first and second power supplies, which are floating in relation to each other; providing a first electrical connector having a distributed impedance for connecting zone apparatus to the first power supply; and providing a signal processor which is operative to draw power from the second power supply and to transmit electrical signals to the zone apparatus and/or receive electrical signals from the zone apparatus, and in which the zone apparatus is operative to draw current from the first power supply, thereby causing a potential drop across the distributed impedance of the first electrical connector, which in turn changes a voltage of a power supply rail at the zone apparatus, characterised by providing a second electrical connector for connecting the power supply rail of the zone apparatus to a power supply rail of the second power supply.

It is to be appreciated that the third aspect of the present invention may include any one or more of the features described above with reference to the first and second aspects of the present invention.

DETAILED DESCRIPTION OF THE INVENTION

A specific embodiment of the present invention will now be described by way of example and with reference to the accompanying drawings.

Figure 1:
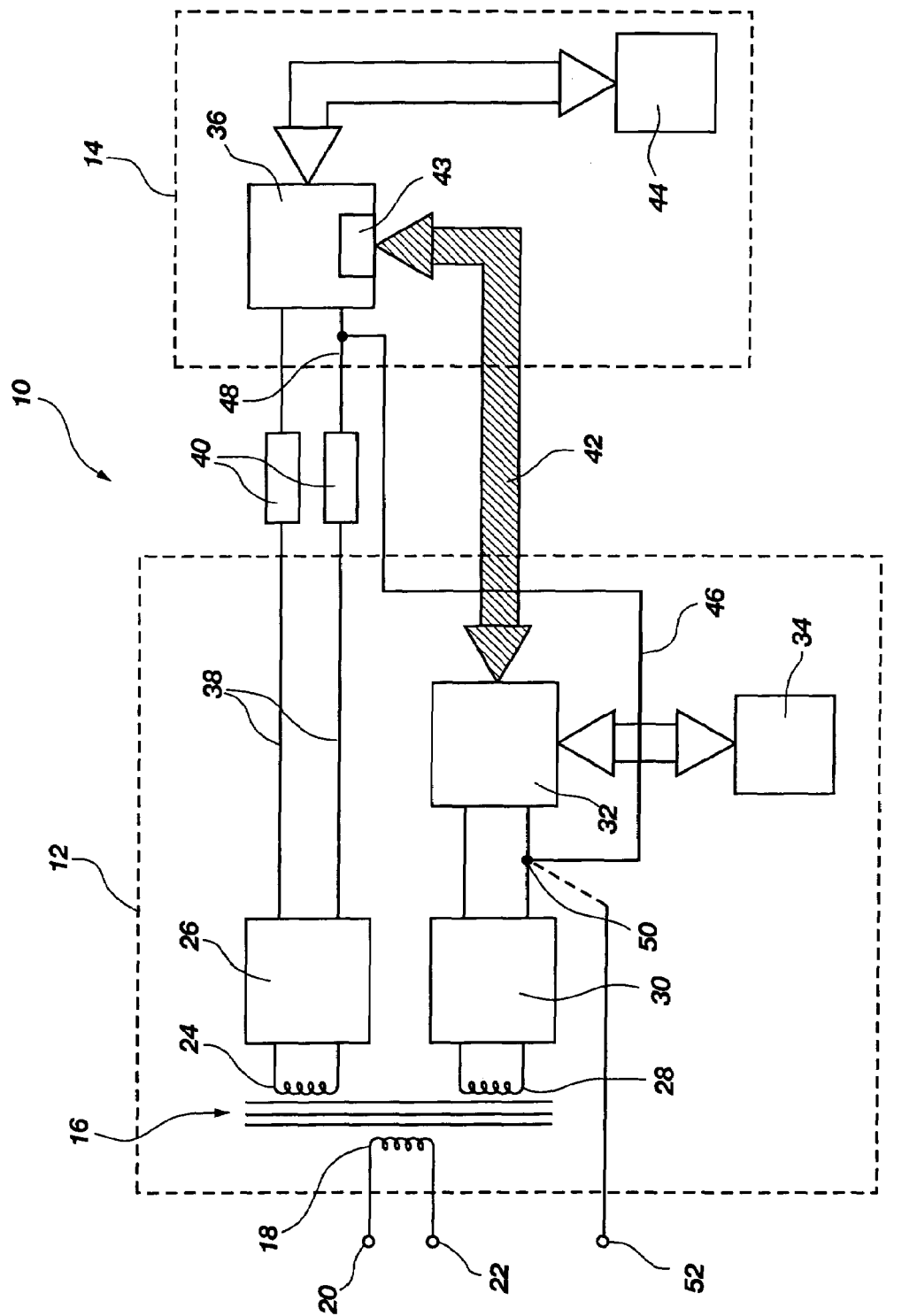
FIG. 1 is a block diagram representation of a distributed entertainment system embodying the present invention.

A block diagram of a distributed entertainment system embodying the invention is shown in FIG. 1. The entertainment system 10 comprises a hub 12 and a zone apparatus 14. (Most practical systems include several such zone apparatus.)

The hub 12 comprises a transformer 16 with a primary winding 18, which is connected to a live connection 20 and a neutral connection 22 of a mains supply. A first secondary winding 24 of the transformer 16 provides electrical power to a first power supply 26. A second secondary winding 28 of the transformer 16 provides electrical power to a second power supply 30. First and second power supplies 26, 30 float in relation to each other. The second power supply 30 provides electrical power to a signal processor 32, which comprises audio circuitry for the processing of audio signals and digital circuitry for the processing of data and control signals. Audio, data and control signals are transmitted to and received from audio/visual source equipment by means of a hub signal port 34.

The zone apparatus 14 comprises an amplifier 36 (which constitutes a device that is operative to draw a varying level of current from the first power supply 26), which receives power by means of a pair of power supply conductors 38 (which constitutes a first electrical connector) from the first power supply 26. At the zone apparatus 14, the pair of power supply conductors 38 constitutes power supply rails of the zone apparatus. Each of the pair of power supply conductors 38 has a natural electrical impedance (which constitutes a distributed impedance), which is represented in FIG. 1 by blocks 40. The amplifier 36 can drive the zone apparatus 14, such as one or more loudspeakers. Audio, data and control signals (which constitute electrical signals) are transmitted between the signal processor 32 in the hub 12 and the zone apparatus 14 by way of audio and data communication means 42. The zone apparatus 14 is provided with circuitry 43 for processing the audio, data and control signals. The audio signal processing circuitry is usually analogue circuitry and the data and control signal processing circuitry is usually digital circuitry. The data and control signals might, for example, be used to control the audio/visual source equipment output characteristics. The zone apparatus 14 is also provided with a zone apparatus signal port 44 for local input and output of audio, data and control signals.

As shown in FIG. 1, an electrical conductor 46 (which constitutes a second electrical connector) provides an electrical connection between a reference power supply rail 48 of the zone apparatus 14 (which constitutes a power supply rail of the zone apparatus 14) and a reference power supply rail 50 of the second power supply 30. The reference power supply rail 50 of the second power supply 30 can be connected to earth potential 52, for example, at the mains supply, if need be.

Figure 2:
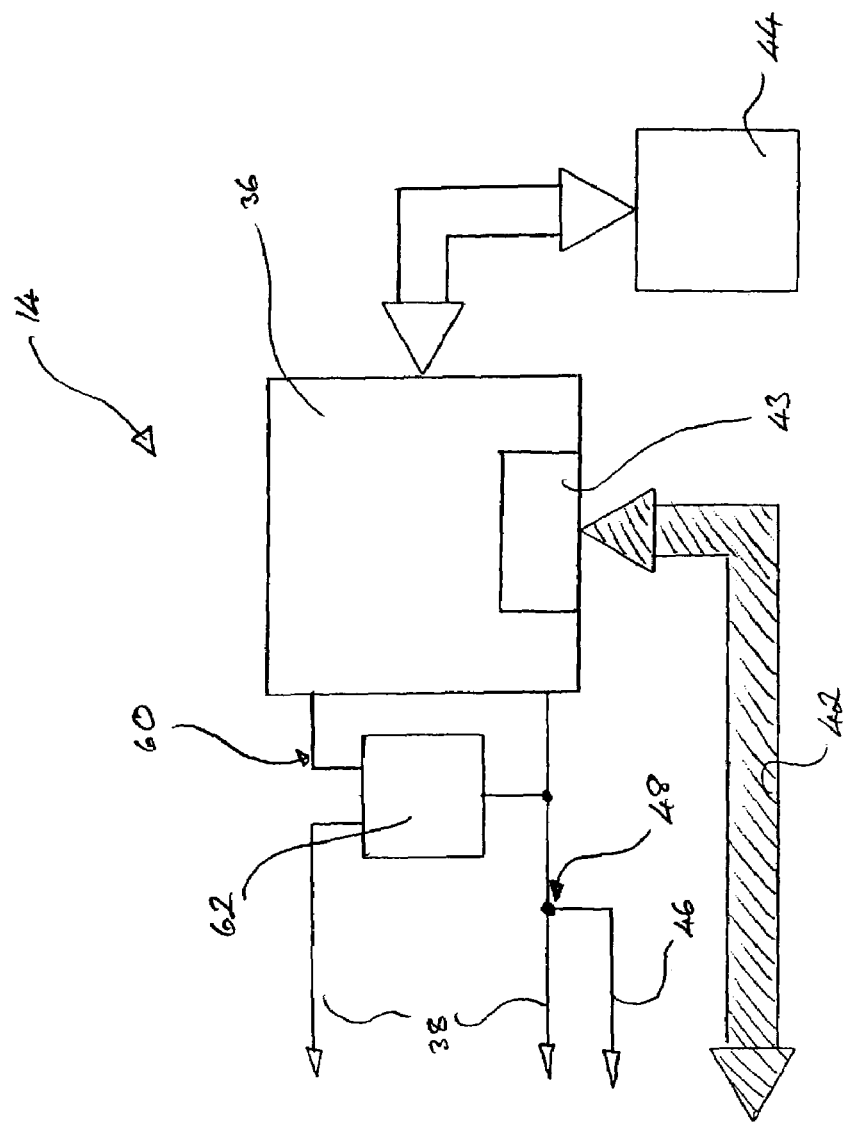
FIG. 2 is a block diagram representation of a zone apparatus of FIG. 1.

FIG. 2 is a block diagram of the zone apparatus 14 of FIG. 1. The zone apparatus 14 comprises the components described above with reference to FIG. 1, namely the amplifier 36, the digital and analogue processing circuitry 43 and the zone apparatus signal port 44. As described above with reference to FIG. 1, the zone apparatus 14 is connected to the pair of power supply conductors 38, the audio and data communications means 42 and the electrical conductor 46. At the zone apparatus 14, one of the pair of power supply conductors 38 is connected to the electrical conductor 46 and constitutes the reference power supply rail 48 for the zone apparatus 14. In addition, the zone apparatus 14 comprises a voltage regulator 62 which is connected between the reference power supply rail 48 and the other of the pair of power supply conductors 38 to provide a second power supply rail 60 for the zone apparatus 14. The voltage regulator 62 regulates the voltage of the second power supply rail 60 in relation to the reference power supply rail 48.

Figure 3:
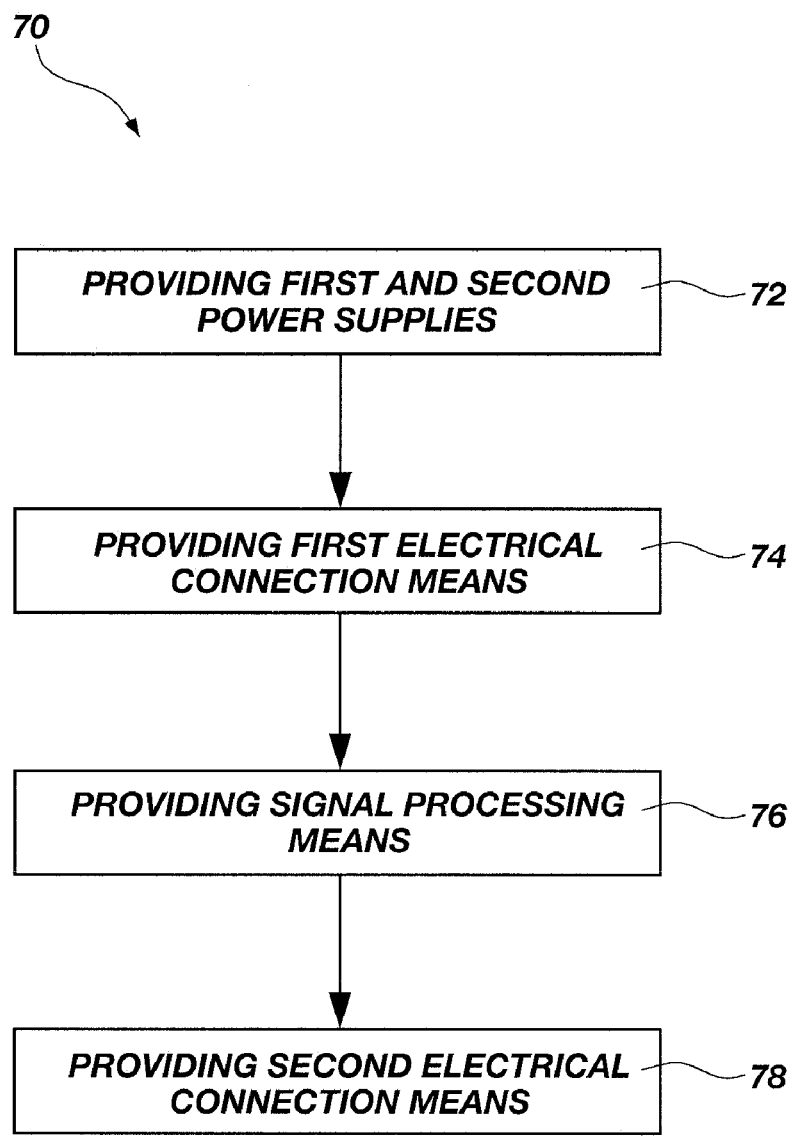
FIG. 3 is a flow chart representation of a method according to the present invention.

A method of arranging a power supply for a distributed entertainment system 70 and a mode of operation for a distributed power supply arrangement will now be described with reference to FIGS. 1 to 3. First and second power supplies 26 and 30 are provided 72, which float in relation to each other. The zone apparatus 14 is connected 74 to the first power supply 26 by means of a pair of power supply conductors 38 (which constitutes a first electrical connector). Signal processor 32 is provided at 76 and draws power from the second power supply 30 and transmits audio, data and control signals (which constitute electrical signals) to the zone apparatus 14 and/or receives data and control signals from the zone apparatus 14.

The amplifier 36 draws a varying level of current from the first power supply 26, thereby causing a varying potential drop across the distributed impedance 40 of the pair of power supply conductors 38. For example, if the distributed impedance 40 of each conductor is "R" and the current drawn is "I," the potential drop across each distributed impedance is "IR" volts. The potential drop in turn changes the voltage delivered to the zone apparatus. For example, the voltage at the reference power supply rail 48 is "IR" volts higher than that provided at one of the outputs of the first power supply 26 and the voltage at the second power supply rail 60 is "IR" volts lower than that provided at the other output of the first power supply 26. The provision of electrical conductor 46, 78 (which constitutes a second electrical connector) holds the reference power supply rail 48 of the zone apparatus 14 and the reference power supply rail 50 of the second power supply 30 at substantially the same voltage. The voltage regulator 62 holds the second power supply rail 60 substantially at a predetermined voltage, e.g., 5 volts, relative to the reference power supply rail 48. Thus, the effects of the potential drop across the distributed impedance of the pair of power supply conductors 38 can be reduced at both the power supply rails 48, 60 of the zone apparatus 14.

A distributed entertainment system embodying the invention can comprise a plurality of zone apparatus. Each of the plurality of zone apparatus comprises the components described above with reference to FIG. 2 and receives power from the hub by means of its own power supply conductors 38, which are provided with electrical power from its own floating power supply 26. Each of the plurality of floating power supplies draws electrical power from its own secondary winding 24 of the transformer 16. The reference power supply rails of the plurality of zone apparatus are electrically connected. Normally, this is achieved by connecting the reference power supply rail 48 of each of the plurality of zone apparatus to the reference power supply rail 50 of the second power supply 30 by means of an electrical conductor 46.

It is to be appreciated that the arrangements, method and other features described with reference to the embodiment discussed above can be combined in other embodiments of the present invention.

The invention claimed is:

1. A power supply arrangement for a distributed entertainment system comprising:
   first and second power supplies, which are floating in relation to each other;
   a first electrical connector having a distributed impedance for connecting zone apparatus to the first power supply; and
   a signal processor which is operative to draw power from the second power supply and to transmit electrical signals to the zone apparatus and/or receive electrical signals from the zone apparatus, and
   in which the zone apparatus is operative to draw current from the first power supply, thereby causing a potential drop across the distributed impedance of the first electrical connector which in turn changes a voltage of a power supply rail at the zone apparatus, characterised by
   a second electrical connector for connecting the power supply rail of the zone apparatus to a power supply rail of the second power supply.

2. The power supply arrangement as claimed in claim 1, in which the signal processor and the zone apparatus comprise digital circuitry and the electrical signals comprise control and data signals of a digital format.

3. The power supply arrangement as claimed in claim 1, in which the second electrical connector electrically connects a reference power supply rail of the zone apparatus to a reference power supply rail of the second power supply.

4. The power supply arrangement as claimed in claim 1, in which the zone apparatus is a device that, in operation, draws a varying level of current from the first power supply.

5. The power supply arrangement as claimed in claim 4, in which the zone apparatus includes an amplifier.

6. The power supply arrangement as claimed in claim 1, in which the zone apparatus comprises a regulator for regulating a voltage of a second power supply rail of the zone apparatus relative to a voltage of the power supply rail of the zone apparatus.

7. The power supply arrangement as claimed in claim 6, in which the power supply rail of the zone apparatus is a reference power supply rail.

8. The power supply arrangement as claimed in claim 1, in which the first and second power supplies are provided by first and second secondary windings of a transformer.

9. A distributed entertainment system comprising a power supply arrangement as claimed in claim 1.

10. A method of arranging a power supply for a distributed entertainment system, comprising:
    providing first and second power supplies, which are floating in relation to each other;
    providing a first electrical connector having a distributed impedance for connecting zone apparatus to the first power supply; and
    providing a signal processor which is operative to draw power from the second power supply and to transmit electrical signals to the zone apparatus and/or receive electrical signals from the zone apparatus, and
    in which the zone apparatus is operative to draw current from the first power supply, thereby causing a potential drop across the distributed impedance of the first electrical connector which in turn changes a voltage of a power supply rail at the zone apparatus, characterised by
    providing a second electrical connector for connecting the power supply rail of the zone apparatus to a power supply rail of the second power supply.

* * * * *

UNITED STATES PATENT AND TRADEMARK OFFICE
CERTIFICATE OF CORRECTION

PATENT NO. : 7,663,265 B2  Page 1 of 1
APPLICATION NO. : 10/346650
DATED : February 16, 2010
INVENTOR(S) : Matthew Forbes Bramble It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2126 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

Page 1 of 1

PATENT NO.      : 7,663,265 B2
APPLICATION NO. : 10/346650
DATED           : February 16, 2010
INVENTOR(S)     : Matthew Forbes Bramble It is certified that error appears in the above-identified patent and that said Letters Patent is hereby corrected as shown below:

On the title page:
In ITEM (56) References Cited
U.S. PATENT DOCUMENTS
Page 1, 1$^{st}$ column, 3$^{rd}$ entry (Line 37), change "Farenelli et al." to --Farinelli et al.--

In the specification:
COLUMN 5, LINE 8,    change "zone apparatus." to --zone apparatus 14.--
COLUMN 5, LINE 28,   change "the hub" to --the hub 12--

In the claims:
CLAIM 6,   COLUMN 6,   LINE 25,   change "to a voltage" to --to the voltage--

Signed and Sealed this
First Day of January, 2013

David J. Kappos
*Director of the United States Patent and Trademark Office*